United States Patent
Jackovitz et al.

[15] 3,650,835
[45] Mar. 21, 1972

[54] PREPARATION OF BATTERY PLATES WITH IRON OXIDES HAVING A FUSED COATING

[72] Inventors: John F. Jackovitz, Monroeville; Alois Langer, Wilkinsburg, both of Pa.

[73] Assignee: Westinghouse Electric Corporation, Pittsburgh, Pa.

[22] Filed: Dec. 16, 1969

[21] Appl. No.: 885,404

Related U.S. Application Data

[62] Division of Ser. No. 764,458, Oct. 2, 1968.

[52] U.S. Cl. .................................. 136/25, 106/70, 117/100
[51] Int. Cl. ........................................................ H01m 43/04
[58] Field of Search .............. 136/25, 120; 252/62.3; 106/70; 117/100, 234

[56] References Cited

UNITED STATES PATENTS

| | | | |
|---|---|---|---|
| 1,761,740 | 6/1930 | Nordlander | 106/70 |
| 2,871,281 | 1/1959 | Moulton et al. | 136/25 |
| 3,181,960 | 5/1965 | King et al. | 106/70 |
| 3,189,668 | 6/1965 | Miller | 106/70 |

*Primary Examiner*—Winston A. Douglas
*Assistant Examiner*—C. F. Lefevour
*Attorney*—F. Shapoe and Alex Mich, Jr.

[57] ABSTRACT

A method of producing active electrode material consists of fusing an elemental sulfur, selenium, or tellurium additive coating onto iron oxide and/or hydrated iron oxide, within a temperature range dependent on the melting point of the additive.

6 Claims, 2 Drawing Figures

Patented March 21, 1972

3,650,835

WITNESSES
Theodore F. Wrobel
Daniel P. Cillo

INVENTORS
John F. Jackovitz
and Alois Langer
BY
ATTORNEY

PREPARATION OF BATTERY PLATES WITH IRON OXIDES HAVING A FUSED COATING

CROSS REFERENCE TO RELATED APPLICATIONS

The present application is a divisional application of application U.S. Ser. No. 764,458, filed on Oct. 2, 1968.

BACKGROUND OF THE INVENTION

This invention relates to a new and improved method of combining sulfur, selenium, or tellurium additives with iron oxides and/or iron oxide hydrates, for use as active electrode material. It solves problems of iron oxide-additive separation during the aqueous slurry impregnation of battery plaques.

It is generally known that an iron battery electrode plate in an alkali electrolyte functions because of oxidation of metallic iron to hydroxides or oxides of iron or both. The exact compositions of the oxidation compound or compounds are not completely known. Although the formation of $Fe(OH)_2$, $Fe_2O_3$, and/or $Fe(OH)_3$ has been postulated, $Fe_3O_4$ seems to be the most probable predominant compound.

The iron battery electrode plate is composed of a finely divided iron oxide powder, deposited or impregnated in a supporting plaque and compacted to a desired density. When pure iron oxide powder is used as an electrode active material in an alkali electrolyte, a battery has limited utilization due to the rapid formation of a passivating film on the iron surface.

To promote the charging of the compacted powder as well as to facilitate the discharging of the electrode plate, a reaction promoting additive for the electrode active material is needed. Such an additive should have the ability to activate the entire substance, though present in relatively small amounts. The properties of such an additive should approach those of a transfer catalyst, causing the breakdown of any protective film and thus keeping the iron active material surface in an active state.

The addition of sulfur or sulfur-bearing materials, such as FeS, as additives to iron oxide powder is known in the art. Such materials have heretofore been incorporated throughout the iron oxide in small amounts, in an intimate mixture rather than a coating. The separate phases of iron oxide powder and sulfur or sulfur-containing salts in intimate mixture, are subsequently converted to a slurry or paste by the addition of water. This slurry is applied to a fibrous plaque where it is pressed to the desired thickness.

Since the most convenient preparation of the iron electrode plate is impregnation with an aqueous slurry of fine particles (about 200 mesh or 74 microns diameter), it is necessary that the sulfur and iron oxide active material components do not separate when water is added. With standard mixing techniques, such separation does occur with resulting loss in utilization of active material and deterioration of battery life.

It has also been found that sulfur bearing materials decompose on prolonged cycling. For example, if FeS is used as an additive, the electrode materials will eventually fail due to slow electrolytic decomposition of FeS, with resulting loss of sulfide ion from the iron electrode region causing subsequent decrease in utilization of the electrode.

SUMMARY OF THE INVENTION

Accordingly, it is the object of this invention to provide new and improved active materials for use on a battery plate by fusion coating elemental sulfur, selenium, or tellurium onto iron oxide and/or iron oxide hydrate particles.

Our invention accomplishes the foregoing object by fusing elemental sulfur, selenium, or tellurium to the iron oxide particle surface, so that subsequent separation of the phases cannot occur during the preparation of the electrode plate.

Comprehensive investigation indicates that no chemical change of either constituent occurs during the fusion process. Plates prepared in such a manner also show longer lifetimes than plates prepared with sulfides as additives.

BRIEF DESCRIPTION OF THE DRAWING

For a better understanding of the invention reference may be made to the drawings, in which.

DESCRIPTION OF THE PREFERRED EMBODIMENTS

Figure 1:
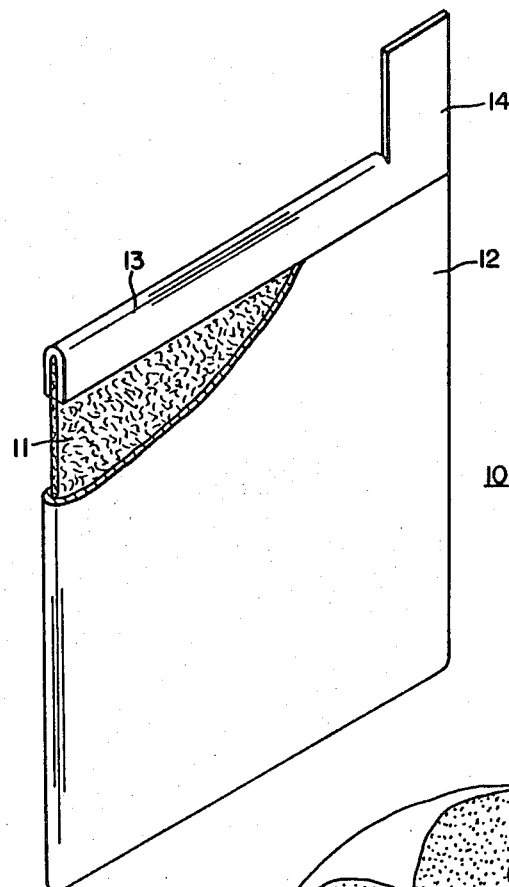
FIG. 1 shows a perspective view of a storage battery plate.

In essence, a battery plate may be generally indicated at 10 in FIG. 1 and includes a supporting metal fiber plaque 11, a body of impregnated active material 12, and a strap 13 having a lead tab 14. The battery plate 10, is intended for use in a suitable electrolyte such as 25 to 40 weight percent potassium hydroxide.

Figure 2:
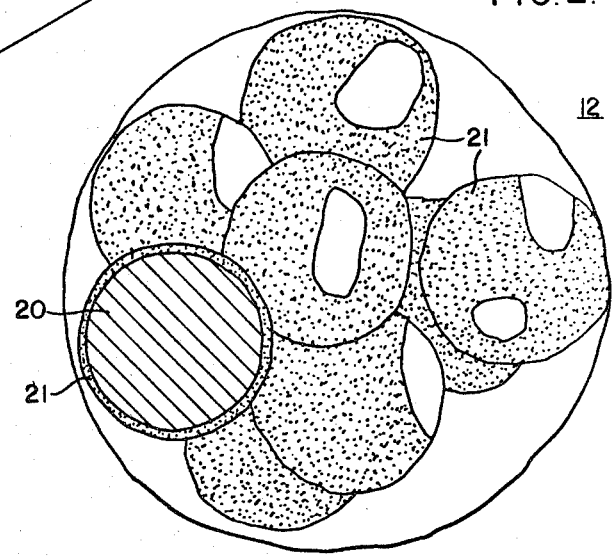
FIG. 2 shows a magnified view of the active material structure.

FIG. 2 shows the active material of this invention, composed of iron oxide and/or iron oxide hydrate particles (the iron particle component) 20, substantially fuse coated with elemental sulfur, selenium, or tellurium 21. The iron oxide particles can be spherical or of irregular shape.

The supporting plaque of FIG. 1, can be composed of a conductive material such as carbon or metal. It must be of a highly porous construction. This may be provided by a mesh or grid of fibrous strands which are randomly disposed either in a woven or in an unwoven texture. For example, the plaque structure 11 may be composed of a mesh of fine nickel fibers which are compacted or pressed together to a density of approximately 10 percent of theoretical with about 90 percent porosity. Referring again to FIG. 1, the plaque 11 is secured at its upper end to the strap 13 which is composed of a conductive material, which, for purpose of illustration may be a crimped member at the upper end of the structure 11 to hold the same in place and to provide good electrical contact. The lead tab 14 is an integral portion of the strap extending upwardly therefrom in a conventional manner. The top edge of the plaque could also be coined to a high density. The lead tab could then be welded onto the coined edge. The body of active material 12 is disposed on and within the interstices of the supporting plaque. The active material is composed of a mixture of particles of average size between about 37 and 74 microns, which have been applied on the plaque by a filtration process in the form of an aqueous slurry, which is compressed to the desired thickness and subsequently dried.

The body of active material can be prepared by initially mixing a slurry of finely divided particles having an average particle size ranging from about 400 to 200 mesh (37 to 74 microns). The active particles include at least one oxide of iron or iron oxide hydrate and the additive. The iron particle component can include ferrous oxide (FeO), ferric oxide ($Fe_2O_3$), ferroso-ferric oxide ($FeO \cdot Fe_2O_3$ or $Fe_3O_4$), hydrated ferric oxide ($Fe_2O_3 \cdot H_2O$), and mixtures thereof in the form of fine precipitates.

The preferred and most practical additive is sulfur, of about 99 percent purity (melting point about 110°–120° C.), in the form of elementary flowers of sulfur, colloidial sulfur, or as pure sulfur particles obtained by evaporation of a solution containing molecular sulfur. The sulfur additive is dry mixed with the iron component particles followed by fusion of the components in a container at 100° C. to 150° C. High purity selenium (melting point about 220° C.) and tellurium (melting point about 452° C.) can also be used as the additive in this invention. Selenium is available as either pellets, stick, or shot at 99.9 percent purity. Tellurium is usually marketed with a purity of over 99.7 percent with most of the impurity as selenium. The additive should be present in the range of about 5–20 percent of the weight of the iron particles.

The iron oxide compound used is commercially known as Mapico Black, a synthetic magnetite containing approximately 22 22% ferrous oxide (FeO) and 77 77% ferric oxide ($Fe_2O_3$). It is prepared by precipitating ferrous hydroxide from an iron salt solution and then oxidizing with air under rigidly controlled conditions to the desired degree of oxidation. The partially oxidized precipitate is dried in a nitrogen atmosphere to prohibit further oxidation. The compound is stable and easily handled at room temperature without fear of oxidation of the iron (II) sites in the lattice.

It has been our experience that surface impurities, initially present on the iron oxide particle surface (less than 1 percent), do not affect the quality of the final electrode material if the fusion procedure is followed carefully. If the fusion vessel lid is not completely tight, allowing gas leakage, then the fusion process serves both to remove impurities from the iron oxide particle surface and to allow sulfur coating of the iron oxide particles.

If preheating the Mapico Black is a necessity, then care should be taken to maintain the temperature below 100° C. while restricting the flow of oxygen around the sample.

The blending process serves only to mix the two components (iron particles and additive) uniformly. The heating temperature is the most critical variable in the fusion coating process and will be dependent on the melting point of the additive.

Samples analyzed show that an average 3 3% reduction in iron (II) content occurs from initial Mapico Black to final sulfur fuse coated product. These same analyses show only trace amounts (less than 0.1 percent) of sulfide or sulfate sulfur. Thus, the fusion process of this invention does not involve a chemical reaction between the additive and oxide but a more simple physical process whereby the irregular surface of the iron oxide particles is fuse coated with the additive.

In the case of sulfur, if the temperature is kept below the melting range of flowers of sulfur, (less than about 100° C.) then the fusion process cannot occur. Separation of the iron oxide and sulfur phases will occur if the non-fused material is left standing in water. The temperature range for fusion of sulfur is from about 100° C. to 150° C. At its melting range (110°–16° C.) and a little above, sulfur is liquid, yellow, transparent and mobile. A transparent coating is thus formed on a surface of the oxide particles which does not detach on prolonged exposure to warm water. If the temperature of fusion exceeds 150° C. the liquid sulfur turns dark brown and becomes increasing viscous as the temperature is further raised causing serious complications which cause poor electrochemical utilization of the active material.

The purpose of the additive is to prevent passivation of the iron during discharge and to create favorable conditions for an effective acceptance of charge. A small amount of sulfur, selenium, or tellurium with $FeO$, $Fe_2O_3$ or $Fe_3O_4$ and/or the iron oxide hydrates such as $Fe_2O_3 \cdot H_2O$, apparently promotes a greater degree of disorder in the crystal structure and thereby enhances diffusion and electrical conductivity of the material. Such additives also influence the hydrogen overvoltage during charging and the uptake of hydrogen by the iron. By such a combined action, the additives influence the rate and completeness of conversion of the iron oxide particles during charging. When an electrode is prepared, it is in the discharged condition. It must then be charged by passing a current to convert the iron oxide and iron oxide hydrates to iron metal. The presence of an additive enhances the acceptance of the charge as well as preventing the passivation of the iron upon subsequent discharge of the electrode. The additive apparently catalyzes the reduction of the iron oxide to metallic iron by inhibiting the formation of hydrogen molecules on the oxide surface. If an additive is not present nearly all of the electrical energy is transformed into hydrogen molecule formation.

EXAMPLE I

Sixteen pounds of 230 mesh Mapico Black (22% $FeO$, 77% $Fe_2O_3$), as received from the Columbian Carbon Co., was blended dry with 600 grams of flowers of sulfur in a Readco AK2 electric mixer for two hours. During this blending process, the temperature of the iron oxide-sulfur mixture increased to 40°–45° C. due to heat generated by friction. While still warm, about four pounds of the material was placed into a Teflon lined stainless steel container and closed with a Teflon lined steel lid. The lid was held in place by bolts extending from a steel base plate under the container and fastened by washers and nuts. These nuts on the lid were only made finger tight so as to allow gas leakage.

To sulfur-fuse, the closed container was placed in an oven at 120° C. for 20 hours and then cooled to room temperature while still closed. The active material was then broken up in a grinder. This material was passed through a 200 mesh screen, all particles being below 74 microns in size, and packaged into polyethylene packets for storage.

The container used for the fusion process had a liquid volume of about 1 gallon. The Teflon (polytetrafluoroethylene) lining protects the container walls from slow attack by sulfur or possible reaction by-products.

The small, almost indetectable, amounts of sulfide or sulfate sulfur present in the final material are due to reaction of sulfur with the atmosphere of the closed container rather than internal reduction-oxidation with the iron oxides. Past experiments show that, if the reaction is carried out in a nitrogen atmosphere, no sulfide or sulfate are formed.

Electrochemical test data was obtained for full size battery plates (55 square inches). One plate was prepared using aqueous slurry impregnation of sintered nickel fiber plaques with our prepared iron sulfur active material. The other plate was impregnated with charged nickel hydroxide. The results were as follows:

TABLE 1

| Sample | 1 | 1 | 3 |
| --- | --- | --- | --- |
| (1) Analysis Of Iron And Sulfur On The Iron Electrode Plate | | | |
| A. Total Sulfur (wt.%) | 9.8 | 8.6 | 6.8 |
| B. Total Iron (wt.%) | 62.0 | 63.0 | 64.0 |
| C. Sulfate (wt.%) | 0.8 | 0.8 | 0.7 |
| D. Sulfide (wt.%) | .02 | .02 | .02 |
| E. Oxygen (wt.%) | 27.3 | 27.5 | 28.4 |
| (2) Electrochemical Data* | | | |
| A. Median Output For Iron Plate (Amp-hr/gm iron-sulfur active material) | 0.50 | 0.46 | 0.49 |
| B. Wt. Iron-Sulfur Active Material Loaded (g./55 sq. in.) | 55.5 | 53.5 | 53.0 |

*Data for single Nickel-Iron plate system in 25 wt.% KOH electrolyte. Drain rate was 50 ma/cm².

Our active battery material did not separate during the aqueous slurry impregnation of the plaques. They showed very high capacity after a few cycles and maintained this capacity on prolonged testing. One cell subject to such testing underwent 250 cycles with no apparent signs of decay. The active material of this invention can be used in iron negative plates for batteries in numerous battery combinations as for example one plate of a nickel-iron battery. The ratio of sulfur and the other additives to iron oxide for acceptable utilization of the iron plate is in the order of 5 to 20 percent of the weight of the iron oxide.

We claim:
1. A method of making battery plates comprising the steps of:
   a. mixing an iron particle component selected from the group consisting of iron oxide particles, iron oxide hydrate particles and mixtures thereof with an elemental additive selected from the group consisting of sulfur, selenium and tellurium, said additive being added in the range of about 5 to 20 percent of the weight of the iron particle component,
   b. heating the mixture, in a container that allows gas leakage, to a temperature within the melting point tem- perature range of the additive to provide a physically fused, non chemically reacted coating of the additive onto the iron component particles so as to substantially cover their surface. and applying a slurry of the coated iron oxide particles to a plaque.

2. The method of claim 1 wherein the iron particle component is selected from the group consisting of FeO, $Fe_2O_3$, $Fe_3O_4$, $Fe_2O_3 \cdot H_2O$ and mixtures thereof.

3. The method of claim 1 wherein the iron component has an average particle size range between about 37 and 74 microns.

4. The method of claim 1 wherein the additive is about 99 percent pure.

5. The method of claim 1 wherein the container has a polytetrafluoroethylene lining.

6. A method of making battery plates comprising the steps of:
a. mixing an iron particle component selected from the group consisting of iron oxide particles, iron oxide hydrate particles and mixtures thereof with elemental sulfur, the sulfur being added in the range of about 5 to 20 percent of the weight of the iron particle component,
b. heating the mixture, in a container that allows gas leakage, at a temperature between about 100° and 150° C. to provide a physically fused, non chemically reacted coating of sulfur on the iron component particles so as to substantially cover their surface. and applying a slurry of the coated iron oxide particles to a plaque.

* * * * *